United States Patent [19]
Reilley

[11] Patent Number: 5,971,547
[45] Date of Patent: Oct. 26, 1999

[54] ASTIGMATIC LENTICULAR PROJECTOR SYSTEM

[76] Inventor: Peter Reilley, 20 King Arthur Dr., Londonderry, N.H. 03053

[21] Appl. No.: 08/899,065

[22] Filed: Jul. 22, 1997

[51] Int. Cl.[6] .................................................. G03B 21/14
[52] U.S. Cl. .............................. 353/122; 353/38; 353/97; 359/232
[58] Field of Search .................................. 353/46, 38, 62, 353/97, 122, 7, 8, 10; 359/232, 205, 207, 668, 670, 210, 209, 216, 15, 16, 17, 19, 20, 448, 458, 463, 464, 465, 466, 471, 475

[56] References Cited

U.S. PATENT DOCUMENTS

| | | |
|---|---|---|
| 3,946,150 | 3/1976 | Grafton ........................................ 359/218 |
| 4,318,583 | 3/1982 | Goshima et al. . |
| 4,488,795 | 12/1984 | Winnek ....................................... 354/115 |
| 4,826,269 | 5/1989 | Streifer et al. . |
| 4,902,084 | 2/1990 | Aharon . |
| 4,917,487 | 4/1990 | Cruickshank ................................ 353/62 |
| 4,934,773 | 6/1990 | Becker ........................................ 250/518.1 |
| 4,945,407 | 7/1990 | Winnek . |
| 5,150,205 | 9/1992 | Um et al. ..................................... 359/209 |
| 5,180,912 | 1/1993 | McEwen et al. ........................... 250/234 |
| 5,192,864 | 3/1993 | McEwan et al. ........................... 250/234 |
| 5,325,386 | 6/1994 | Jewell et al. ................................. 372/50 |
| 5,398,082 | 3/1995 | Henderson et al. ........................ 359/210 |
| 5,489,950 | 2/1996 | Masuda ....................................... 348/744 |
| 5,499,067 | 3/1996 | Shibazaki ..................................... 353/99 |
| 5,513,036 | 4/1996 | Watanabe et al. .......................... 359/457 |
| 5,513,037 | 4/1996 | Yoshida et al. ............................. 359/457 |
| 5,543,874 | 8/1996 | Winnek . |
| 5,786,939 | 7/1998 | Watanabe ..................................... 353/38 |
| 5,838,480 | 11/1998 | McIntyre et al. .......................... 359/207 |

*Primary Examiner*—William Dowling
*Attorney, Agent, or Firm*—Iandiorio & Teska; Brian J. Colandreo

[57] ABSTRACT

An astigmatic lenticular projector system includes a beam former for generating a family of planar light beams representative of an object; and an image former for diverging the light in each of the planar light beams transversely to the plane of the beams and not diverging the light along the plane of the beams for generating a viewable astigmatic image.

35 Claims, 11 Drawing Sheets

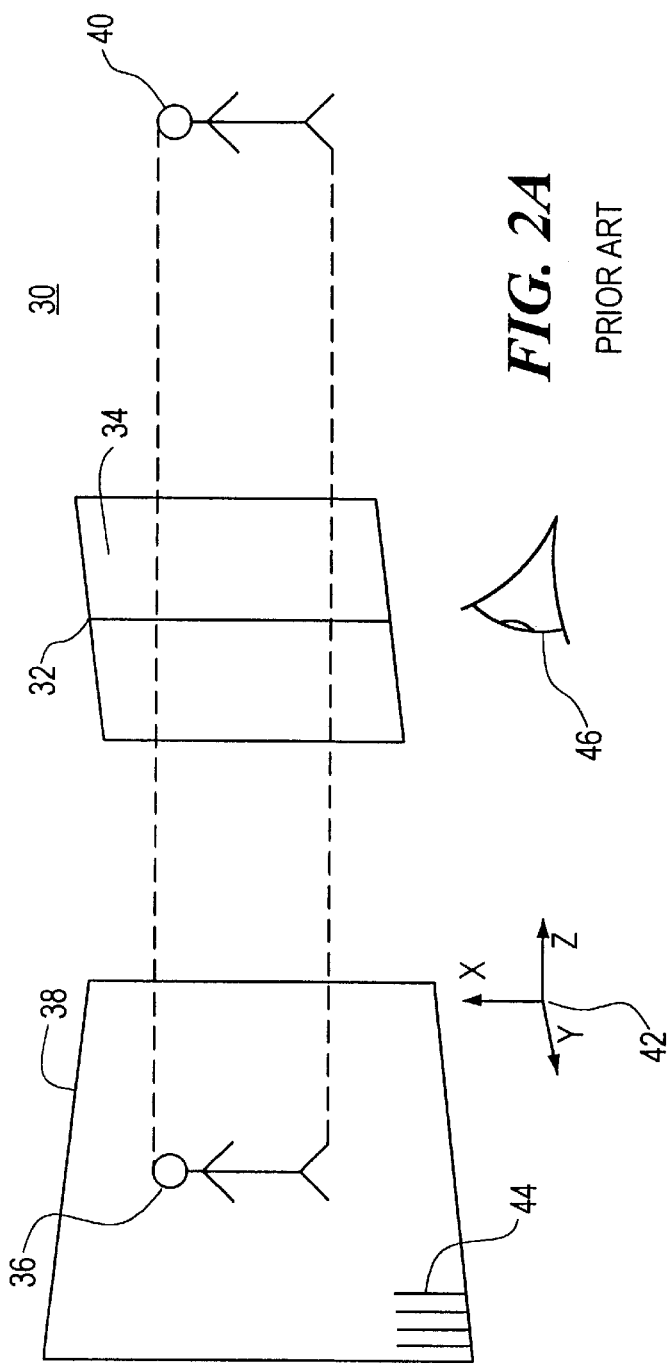
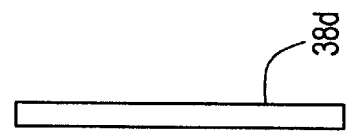
FIG. 2E
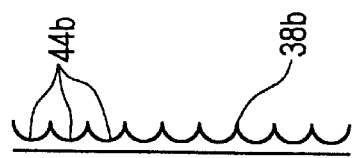
FIG. 2D
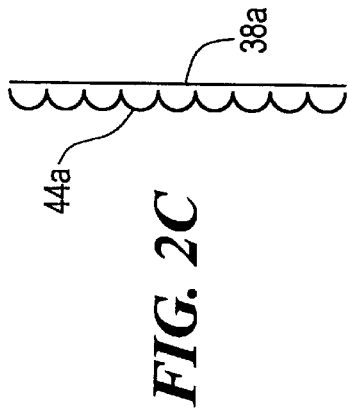
FIG. 2C
FIG. 2A
PRIOR ART

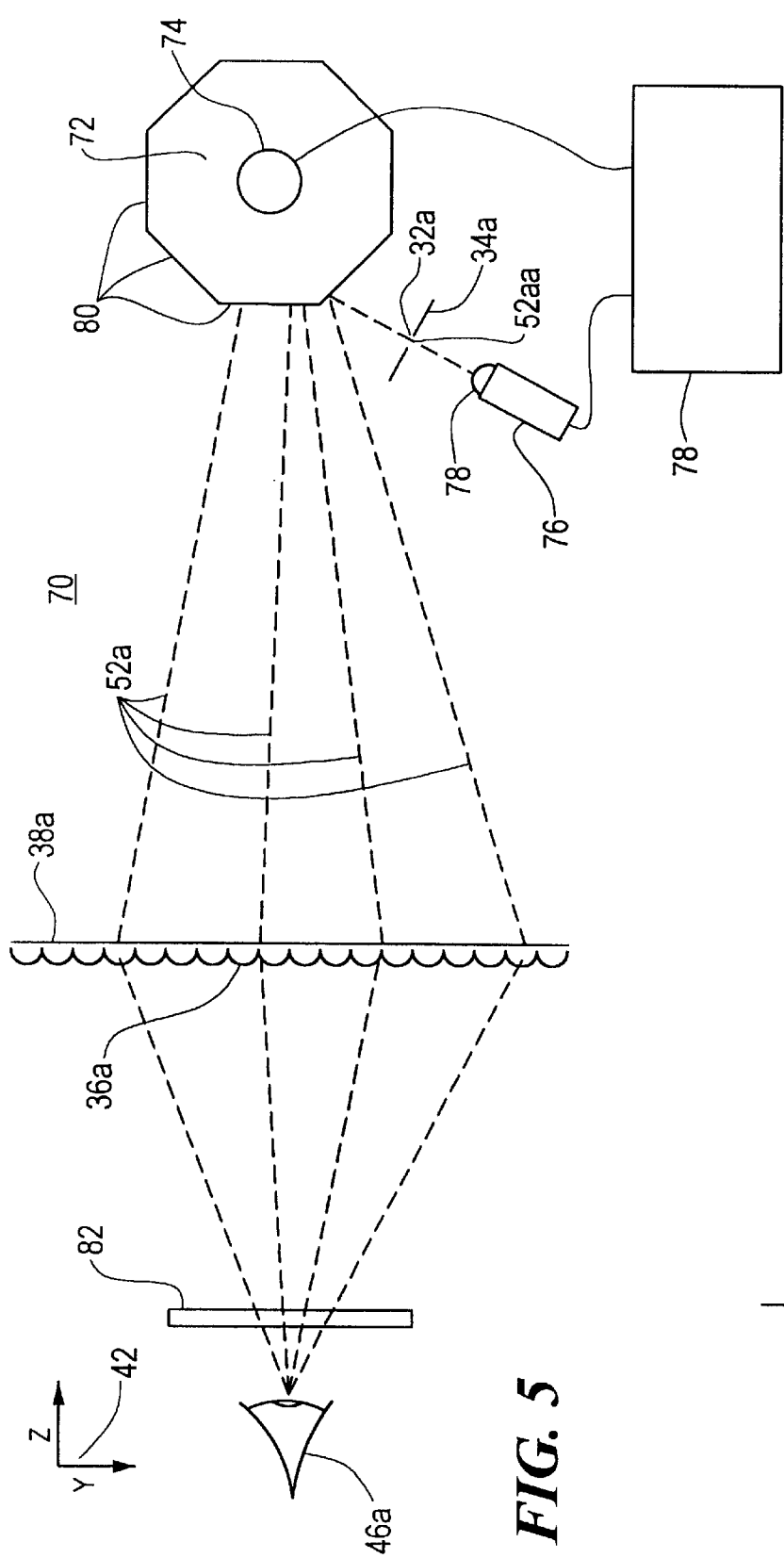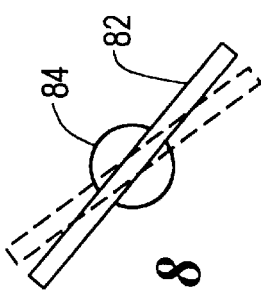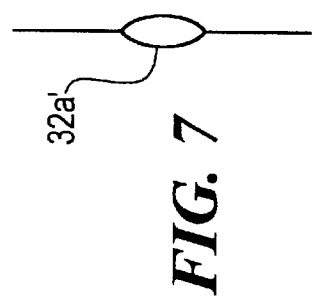
FIG. 5
FIG. 8
FIG. 7

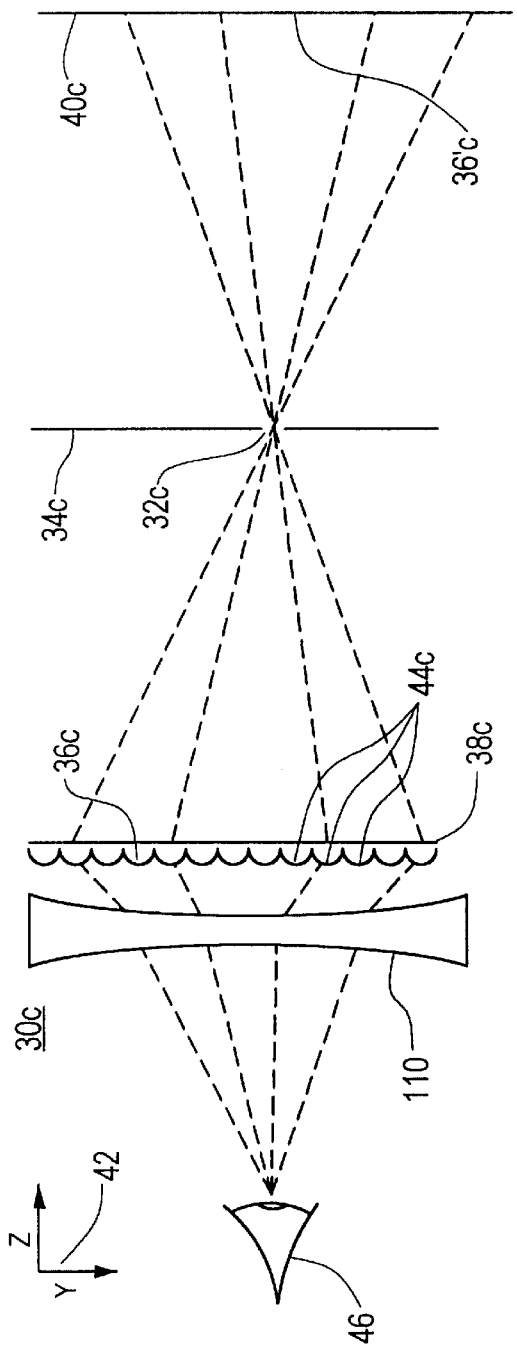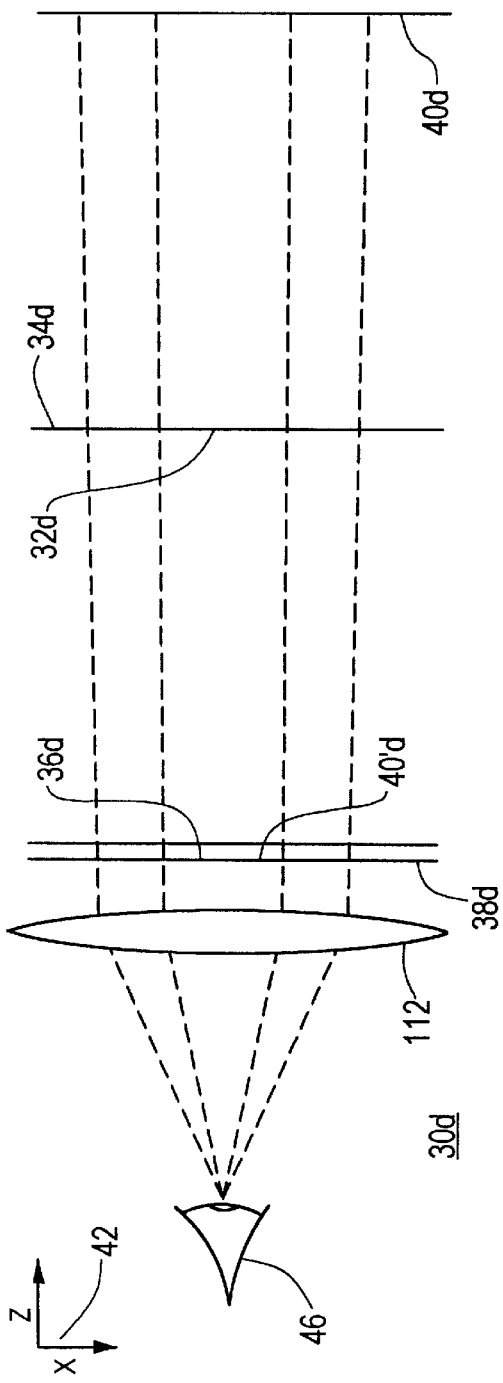

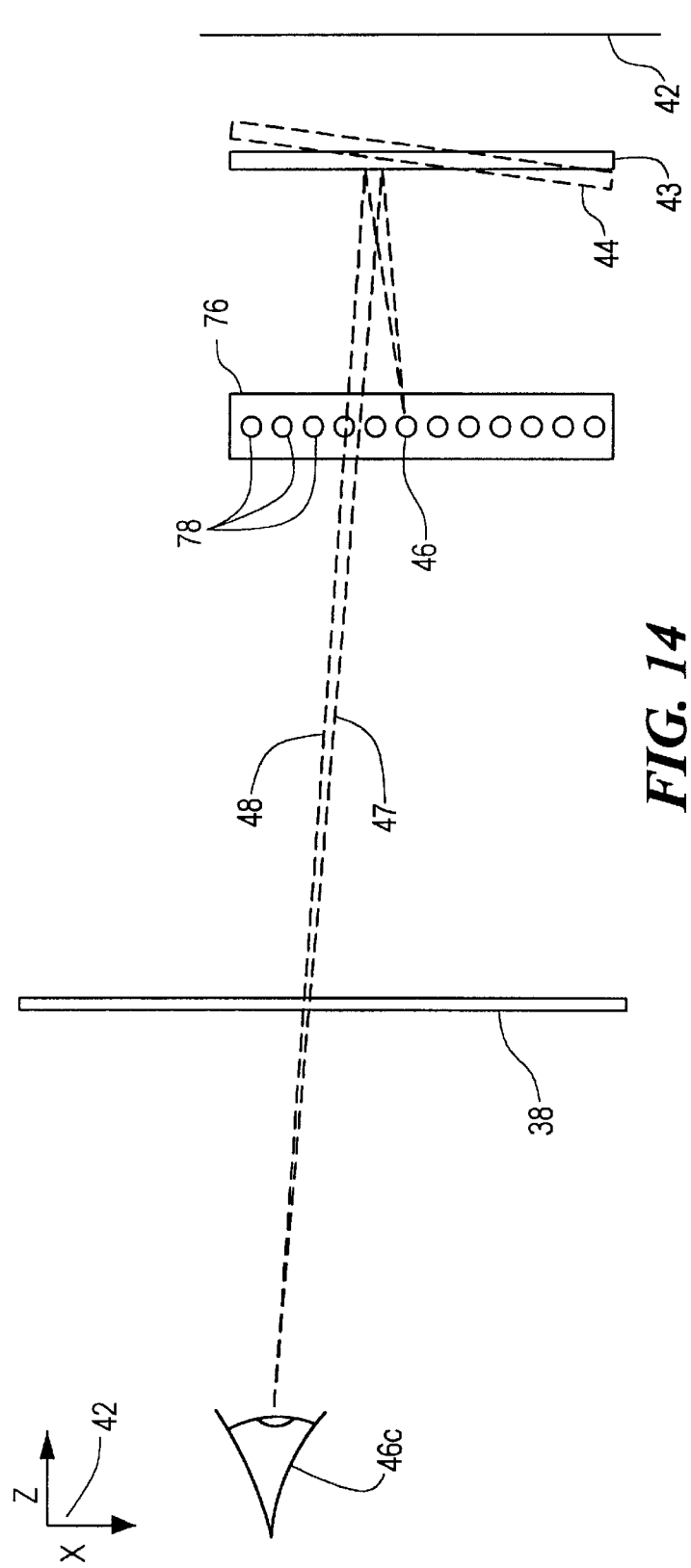
FIG. 14
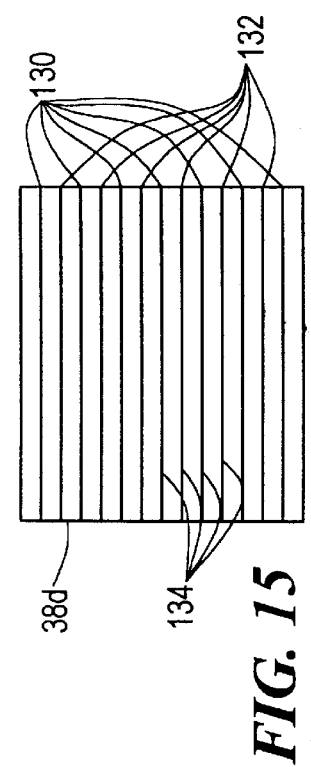
FIG. 15
FIG. 14A

ASTIGMATIC LENTICULAR PROJECTOR SYSTEM

FIELD OF INVENTION

This invention relates to an astigmatic lenticular projector system.

BACKGROUND OF INVENTION

There are a number of well-known methods of projecting an image onto a screen where it can be viewed. Probably the earliest is the pin hole camera. This employs an opaque panel with a small hole through which light passes. Light reflected from a subject passes through the pin hole and strikes the screen where an image is formed. An advantage of this design is that the projected image is in focus at all distances between the screen, the pin hole, and the subject being projected; a disadvantage is its extreme optical efficiency. Of all the light that is reflected from the subject only a very small portion passes through the pin hole. This results in a very dim projected image.

A similar method of projecting an image replaces the pin hole with a lens. In this scheme light reflected from the subject passes through a lens and strikes the screen where the image is formed. The advantages are greatly improved optical efficiency. The lens collects far more of the reflected light than the pin hole of the previous scheme. The major disadvantage is that the positioning of the subject, the lens, and the projection screen must be set according to the well-known lens formula. If the positions are not correct then the image formed on the screen will be out of focus.

Another method of projecting an image involves sequential scanning. The image is generated by scanning a beam across the screen. If the scanning process is fast enough the eye will see a steady image. Early televisions produced an image by mechanically scanning a light beam across the screen in raster fashion. The intensity of the light beam was modulated to produce the image. The current television system uses a cathode ray tube (CRT) that has an electron beam that sequentially scans a screen of phosphorescent material. The phosphorescent screen emits light when struck by the electron beam. The image is produced by modulating the intensity of the electron beam.

The major advantage of the sequential scanning systems is that the image can be transmitted long distances electronically. A major disadvantage is that the image resolution is limited by the speed at which each pixel that makes up the image can be refreshed. The image must be refreshed at least 25 to 30 frames per second for television and 60 to 80 frames per second for computer or the human eye will see flicker in the generated image.

An image that has 1024 pixels by 1296 pixels and is refreshed at a rate of 80 Hz has a pixel clock rate of at least 106 MHz. This is a common set of parameters used in computers today. As the number of pixels increases the pixel clock rate must increase as well. This places a limit on the resolution that is obtainable with the current technology. Further, as the pixel speed increases the amount of energy delivered to each pixel on the screen decreases thereby making the image dimmer.

It is possible to create larger images by using multiple CRTs to create an image that is tiled together. The image on a CRT is not geometrically precise due to the difficulty in accurately positioning the electron beam. The tiled images do not line up well. This leaves gaps and distortion at the boundaries.

SUMMARY OF INVENTION

It is therefore an object of this invention to provide an improved, high speed, high resolution and simpler astigmatic lenticular projector system.

It is a further object to provide such a system which is optically efficient and provides bright images.

It is a further object to provide such a system which has a broad range of focus.

It is a further object to provide such a system in which resolution is not limited by refresh speed.

It is a further object to provide such a system in which scan lines are generated in parallel allowing for much higher frame rates and resolution.

It is a further object to provide such a system which allows tiling without gaps or misalignment.

The invention results from the realization that an improved simple, high speed, high resolution projector system which produces an astigmatic but viewable image can be achieved using an astigmatic lenticular approach in which a family of planar light beams are generated and projected onto an image forming lenticular device which diverges the light in each of the planar light beams transversely to the planes of the beams, and the further realization that by scanning a planar beam from a light source to form a family of planar beams all scan lines can be generated in parallel dramatically reducing the number of discrete scanning events and allowing for much increase in the scan speed.

This invention features an astigmatic lenticular projector system including beam forming means for generating a family of planar light beams representative of an object; and an image forming means for diverging the light in each of the planar light beams transversely to the plane of the beams and not diverging the light along the plane of the beams for generating a viewable astigmatic image.

In a preferred embodiment the beam forming means creates one focal length for the astigmatic image along the plane of the planar light beams and the image forming means creates a second focal length for the astigmatic image transverse to the plane of the planar light beams. The beam forming means may include a mask with an elongated slit. The image forming means may include a parallel array of astigmatic lenses. The parallel array of astigmatic lenses may include cylindrical lenses. The image forming means may include a lenticular array of lenticules. The image forming means may be a holographic element. The cylindrical lenses may be concave or convex. The beam forming means may include a light source for creating a planar light beam and scanner means for sweeping the light beam across the image forming means to create the family of planar light beams. The light source may include a source of illumination and a mask with an elongate slit. The scanner means may include a rotatable multifaceted mirror wheel and means for rotating the mirror wheel. The light source may include a set of discrete illumination elements for creating a set of scan lines in the astigmatic image. The light source may include a number of sets of discrete illumination elements, each set having a different color. The image forming means may include a cylindrical aligning lens with its axis parallel to the axes of the family of planar light beams for aligning the viewing angle across the image forming means. The image forming means may include astigmatic correction lens means for relatively adjusting the focal length towards each other. The astigmatic correction lens means may equalize the focal length. The astigmatic correction lens means may include a convex cylindrical lens and/or a concave cylindrical lens. The image forming means may include a magnifying lens for enlarging the image in the direction parallel to the family of planar beams. The magnifying lens may be a cylindrical lens with its axis transverse to the family of planar beams. The light may be visible light. The beam forming means may include polarizing means for generating dual images of opposite polarization for creating three-dimensional images. The facets of the mirror wheel may be tilted with respect to one another to increase the number of scan lines or each facet may have a number of inclined sections for that same purpose. The astigmatic correction lens may create a virtual image of one of the images at the focal point of the other.

DISCLOSURE OF PREFERRED EMBODIMENT

Other objects, features and advantages will occur to those skilled in the art from the following description of a preferred embodiment and the accompanying drawings, in which:

FIG. 2A is a schematic ray diagram illustrating the construction of a static image with an astigmatic lenticular projector system according to this invention;

FIG. 2C is a side elevational sectional view of the lenticular screen of FIGS. 2A and B having convex lenticulars;

FIG. 2D is a side elevational sectional view of the lenticular screen of FIGS. 2A and B having concave lenticulars;

FIG. 2E is a side elevational sectional view of the lenticular screen of FIGS. 2A and B using holographic lenticulars;

FIG. 5 is a schematic top view ray diagram illustrating the construction of an image with an astigmatic lenticular projector system according to this invention for a scanned image using a rotating faceted mirror wheel and a single column array light source;

FIG. 7 is a side elevational schematic view of a double convex cylindrical lens which can be used in place of the slit in FIG. 5;

FIG. 8 is a top schematic view of an oscillating mirror alternative to the mirror wheel of FIG. 5;

FIG. 11 is a view of the system of FIG. 3 with a concave cylindrical lens added to merge the two astigmatic image portions into one at the object plane;

FIG. 12 is a view of the system of FIG. 3 with a convex cylindrical lens added to merge the two astigmatic image portions into one at the lenticular screen;

FIG. 14 is a view similar to FIG. 6 with tilted facets for doubling scan lines;

FIG. 14A is a side elevational diagrammatic view of an angled facet usable in the embodiment of FIG. 14;

FIG. 15 is an illustration of the image with double the number of scan lines achieved by the embodiments of FIGS. 14 and 14A.

Figure 1:
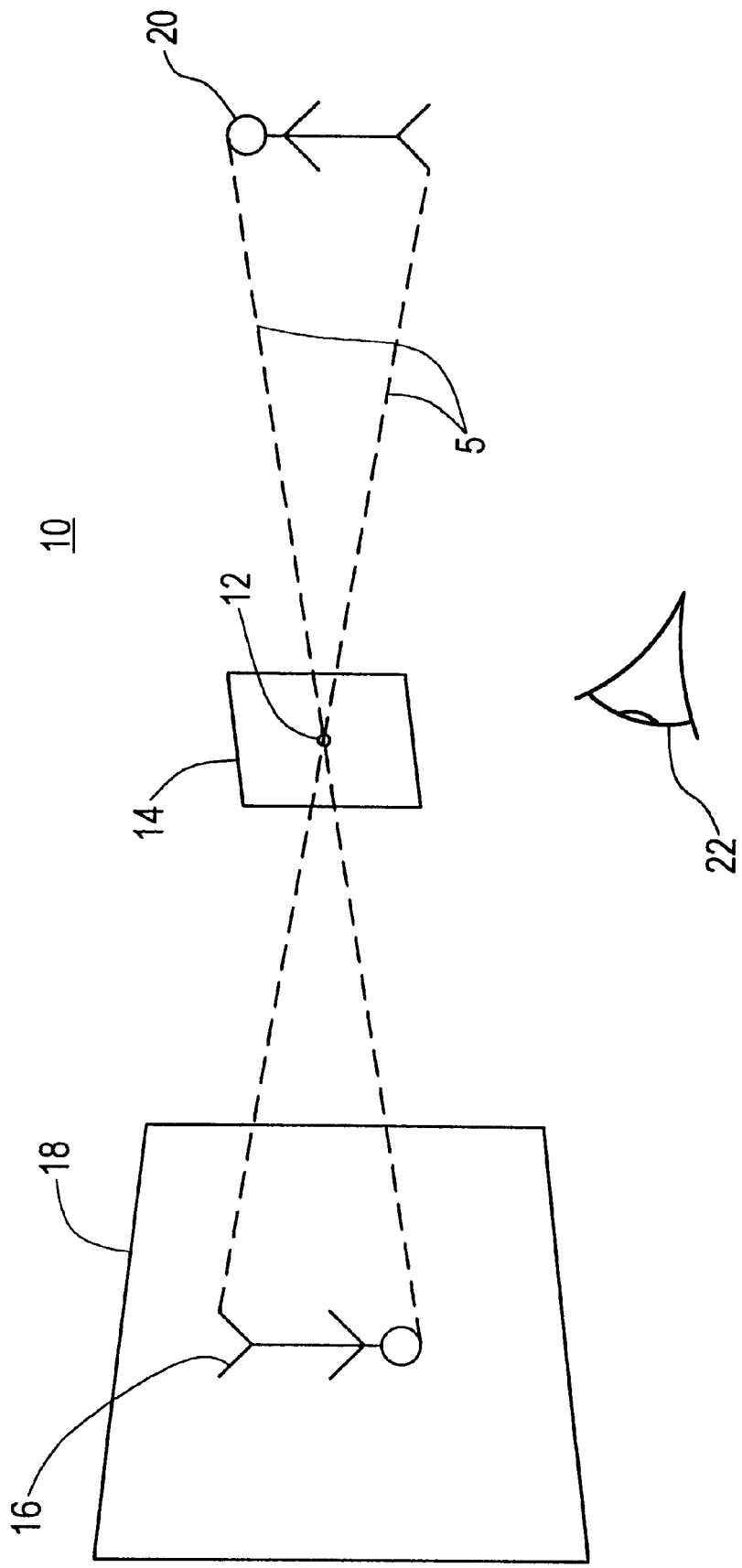
FIG. 1 is a schematic ray diagram illustrating the construction of an image with a conventional pin hole camera.
Figure 2B:
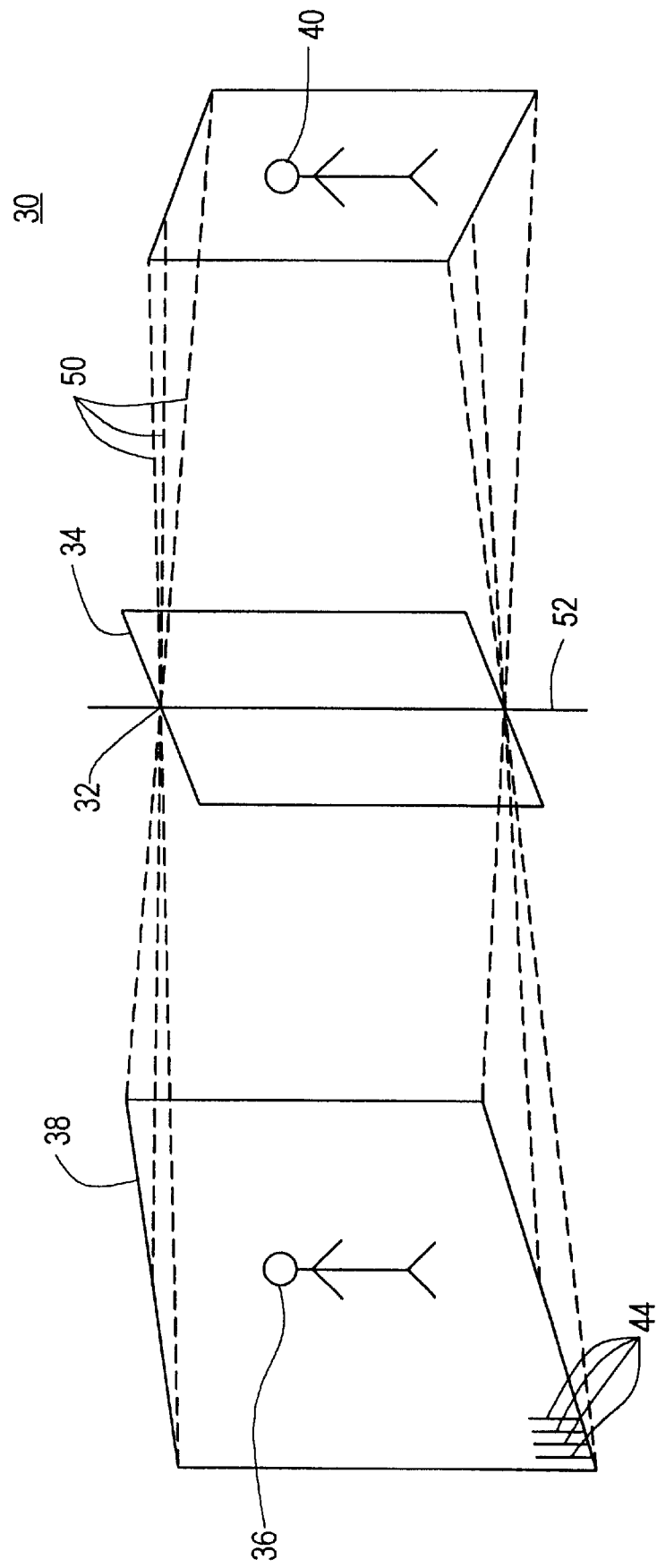
FIG. 2B is a three-dimensional view of the system of FIG. 2A.

There is shown in FIG. 1 a conventional pin hole camera 10 which uses a pin hole 12 in mask 14 to create an inverted image 16 on screen 18 of the subject or object 20. Screen 18 is made of a diffusely reflecting material. The viewer 22 sees the image on the front side of screen 18. If screen 18 is translucent then the image can be seen on the back side. A simplified astigmatic lenticular projector system 30, FIG. 2A, according to this invention employs an elongated slit 32 in mask 34 to create image 36 on lenticular screen 38 of the object 40. For ease of reference an axes graphic 42 illustrates that the slit axis extends in the X dimension, the viewing axis in the Z dimension and the divergence axis of the lenticules 44 of lenticular screen 38 extend in the Y dimension. While axis graphic 42 shows that the axes are mutually perpendicular, this is not a necessary limitation of the invention, although they should be mutually transverse. The viewer 46 sees the image right side up on the front side of the mirrored lenticular screen 38. If screen 38 is clear lenticular then image 36 can be seen on the back side. The object actually creates a family of planes 50, FIG. 2B, which extend from the object 40 through slit 32 and have a common axis 52 with slit 32. Lenticular screen 38 can be made of any suitable matter so that it diverges the light in the dimension transverse to the slit but does not diverge it parallel to the slit. For example, lenticular screen 38a, FIG. 2C, may be made of convex lenticules 44a which may be convex cylindrical lenses, or lenticular screen 38 may be made as screen 38b, FIG. 2D, of concave lenticules 44b, for example, formed of concave cylindrical lenses. Alternatively, lenticular screen 38 may be made of a holographic element 38d, FIG. 2E.

Figure 3:
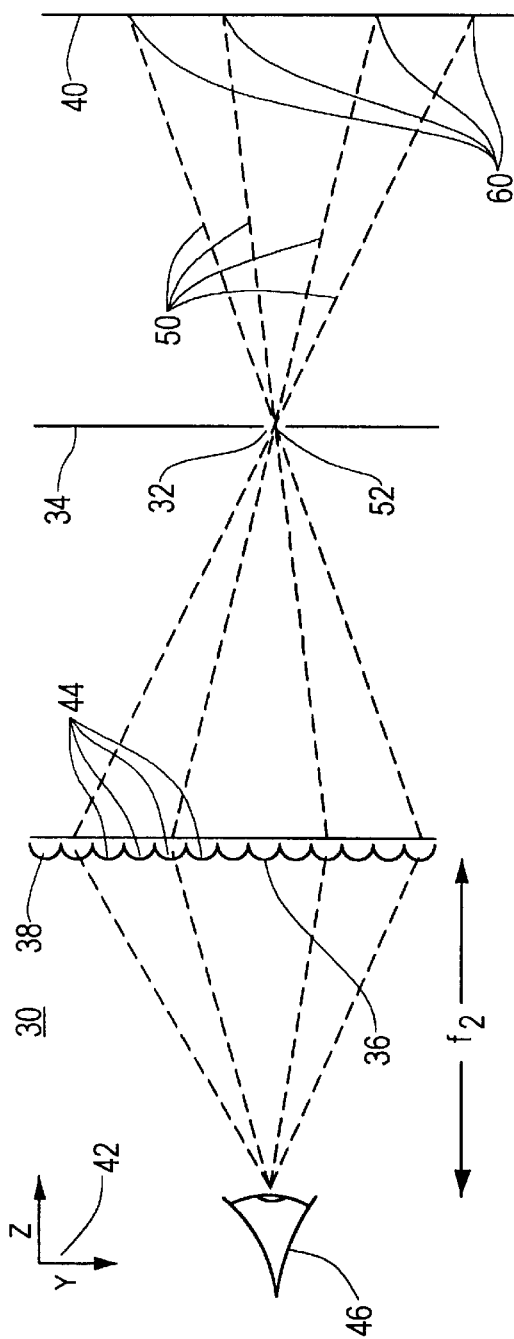
FIG. 3 is a schematic ray diagram illustrating the appearance of the image at the lenticular screen in the dimension transverse to the axis of the lenticular and slit.
Figure 4:
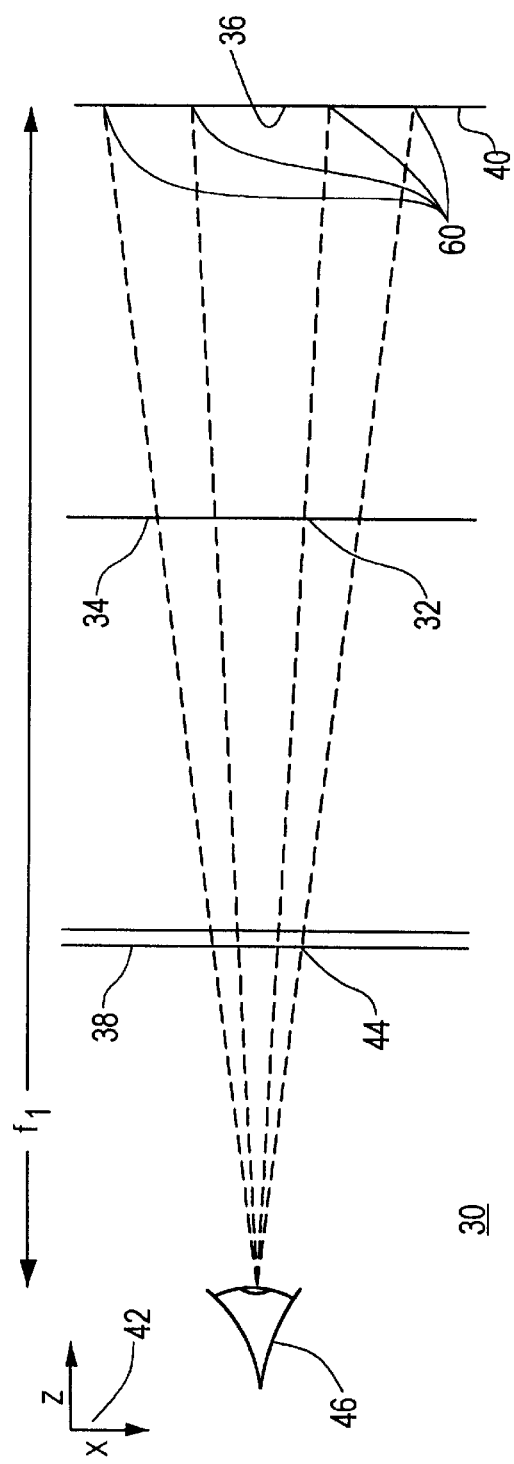
FIG. 4 is a schematic ray diagram illustrating the appearance of the image at the object in the dimension parallel to the axes of the lenticules and slit.

The astigmatic image formed in accordance with this invention is explained in more detail in FIGS. 3 and 4. There it can be seen that the subject 40 illuminated by light rays 60 create a family of planes 50 which pass through slit 32 in mask 34 intersecting at axes 52 which is also the axis of slit 32 and impinge upon lenticular screen 38. The lenticules of cylindrical lenses 44 refract the light toward the viewer 46 to form the image 36 on lenticular screen 38. The focal distance then appears to be the distance $f_2$ from the observer to the lenticular screen 38. In the X-Z plane, FIG. 4, light 60 impinge upon object 40 and travels through slit 32 in mask 34 to impinge on the lenticules 44. The image 36 in this dimension actually appears at the subject or object 40 at focal length $f_1$. Thus occurs the astigmatic image.

Figure 6:
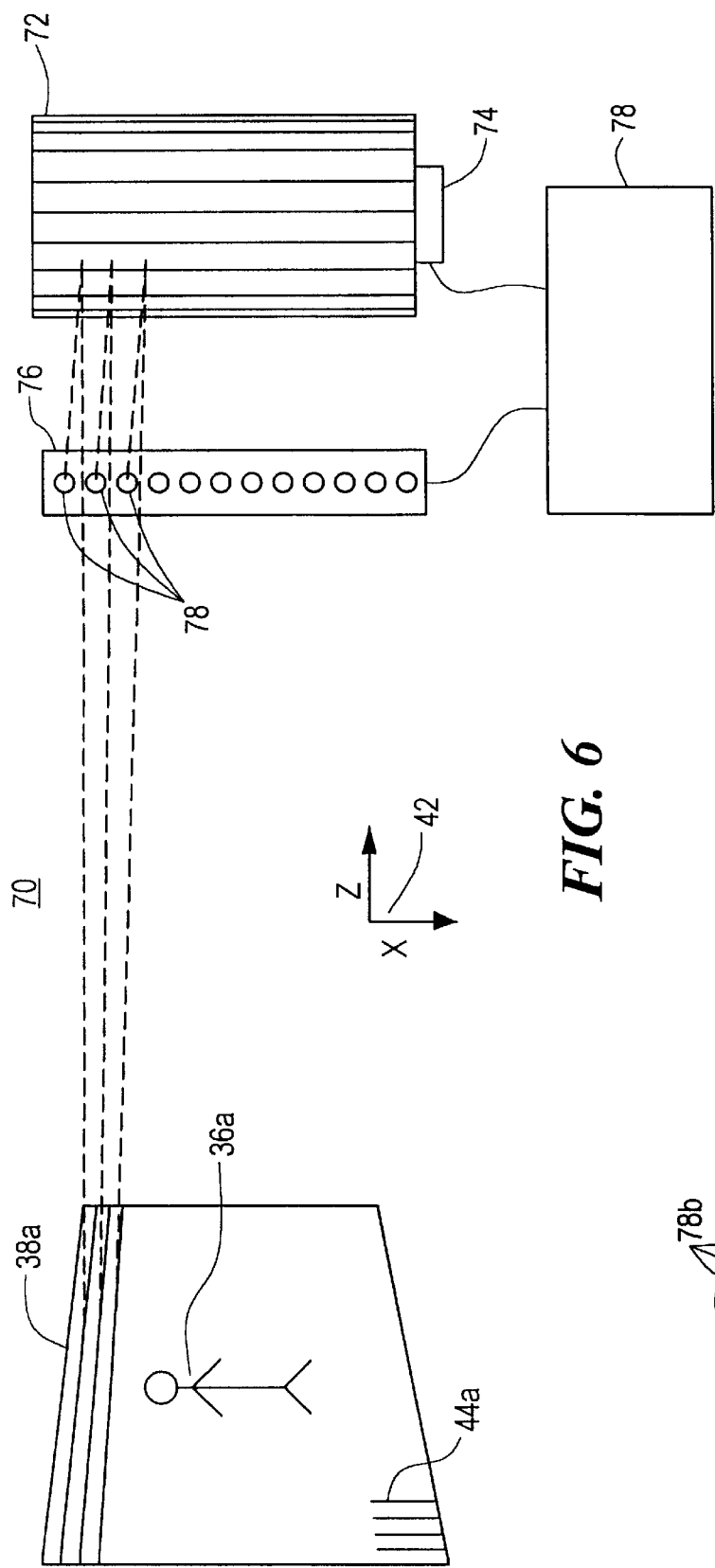
FIG. 6 is a schematic side view of the ray diagram of FIG. 5 with the slit omitted for clarity.

Although thus far the invention has been described with a static imaging system, this is not a necessary limitation of the invention as a dynamic imaging system may be used as shown in scanning system 70, FIGS. 5 and 6, which employs a rotating mirror wheel 72 driven by a suitable motor 74 and illuminated by a linear light source 76 which may, for example, be composed of a number of LEDs 78 arranged in a single column. Between light source 76 and rotating wheel 72 is a mask 34a with slit 32a. Mask 34a with slit 32a have been omitted in FIG. 6 for clarity of illustration only. The speed of the wheel and the pulsing of the element 78 of the light source 76 is driven by scanner control circuit 78 to produce an image in a conventional method well known to those skilled in the art. The scanning mirror wheel 72 sweeps a planar beam of light 52a across lenticular screen 38a to create there image 36a. The axis of the intersection of the planes 52a is now separate from the axis 52aa of slit 32a and the axis 52a of the intersection of the planes actually moves slightly due to the rotation of mirror wheel 72, but the optical effect is the same.

Mirror wheel 72 has a plurality of facets, in this case shown simply as including merely eight facets 80. These facets may be simply mirrors, or they may be colored mirrors, each succeeding mirror being a different color in a series red, blue and green, so that with the proper timing a color image can be created at lenticular screen 38a. Or, mirror facets 80 may contain polarizing elements so that alternate ones of the facets oppositely polarize the light. For example, one facet may be circularly polarized in a clockwise direction, the next in a counterclockwise direction, the next in the clockwise direction again. Or, they be linearly polarized simply horizontally, then vertically, horizontally, then vertically. In that case a polarizing element 82 may be provided between viewer 46a and lenticular screen 38a to see a three-dimensional image where polarizing element 82 contains two polarization analyzers for depolarizing each of the two oppositely polarized beams coming in, one for each of the eyes of the viewer. The beam forming means in its simplest form has been explained as a slit, but it may also be implemented using a cylindrical lens such as double convex cylindrical lens 32a', FIG. 7. This creates the same effect of a family of planes as does slit 32a.

Figure 9:
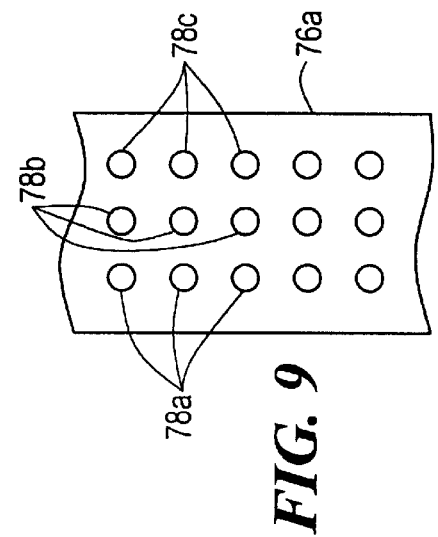
FIG. 9 is a front elevational schematic view of a multi-column array light source for use in the system of FIGS. 5 and 8 for producing a multicolor or a polarized three-dimensional image.

Although the scanning means is shown as a rotating mirror wheel, this is not a necessary limitation of the invention. For example, an oscillating mirror 82, FIG. 8, driven by an oscillator motor 84 or any other suitable scanning mechanism, can be used. Although the provision of color and/or three-dimensional viewing through polarization is illustrated in FIGS. 5 and 6 by accommodating mirror facets 80, this is not a necessary limitation of the invention either. For example, to provide the three-color combination of red, blue and green a three column light source 76a, FIG. 9, may be used in which one column of light sources 78a is red, the second column 78b is blue, and the third column 78c is green. For three-dimensional viewing by means of polarization, one could provide one type of polarization on the light source element 78a and the opposite polarization on the light source element 78b, and simply omit the light source element 78c in the third column.

Figure 10:
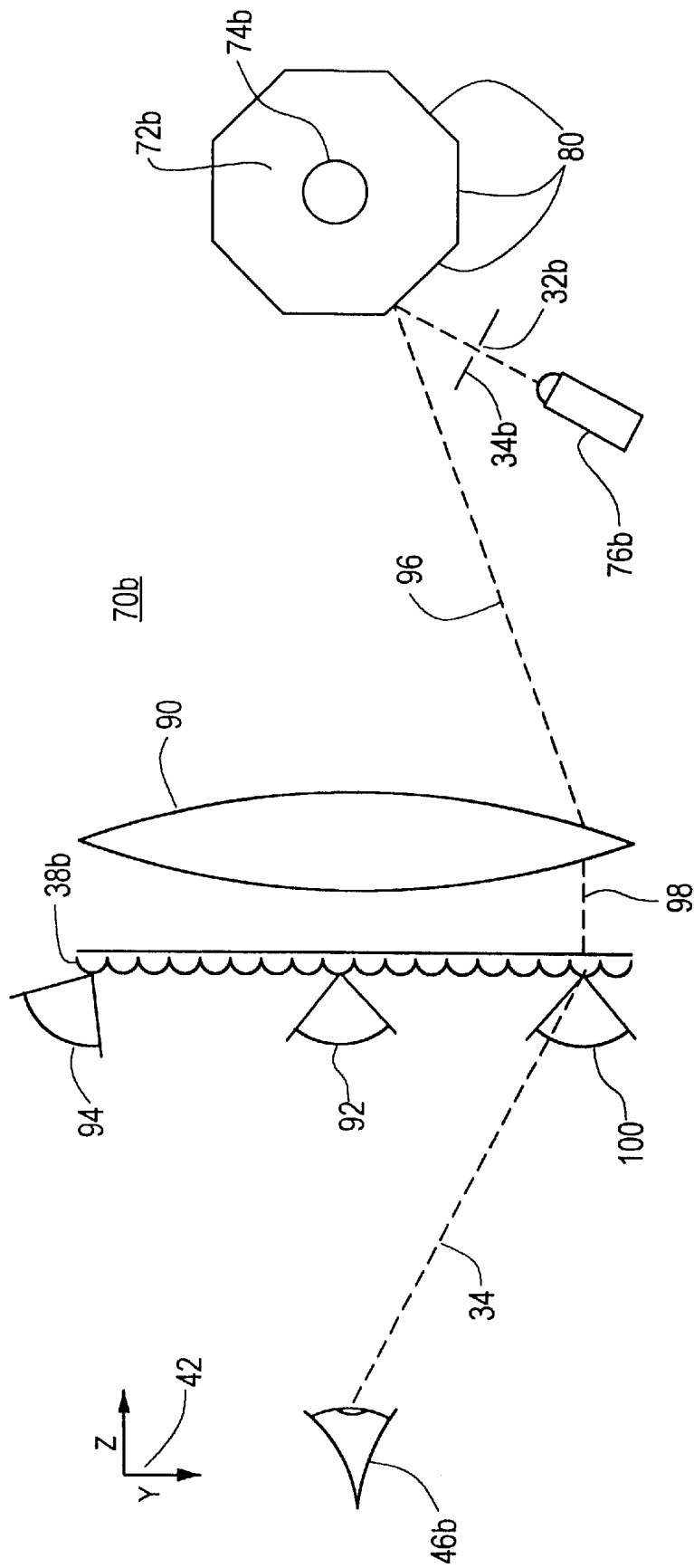
FIG. 10 is a view of the system of FIG. 5 with an additional lens to improve the viewing angle.

The viewing angle for the observer 46b, FIG. 10, can be improved by adding a cylindrical lens such as double convex cylindrical lens 90, FIG. 10. Without lens 90 the light strikes lenticular screen 38b at varying angles. The light striking near the center of the lenticular screen 38b is diverted equally in both directions as indicated by the viewing angle indicator 92. However, light that strikes near the edge of the lenticular screen is diverged more outwardly as indicated by the viewing angle indicator 94. Thus the viewing angle is not the same across the entire lenticular screen 38b. Lens 90 bends the light so that it is perpendicular to lenticular screen 38b. Even when the light approaches the edge of the screen as indicated by ray 96, lens 90 bends the light so that it is perpendicular to the screen as indicated at 98 so that the light will be diverged through the same viewing angle, as indicated by viewing angle indicator 100, as it is at the center of the screen. Again, it could be a normal cylindrical lens or it can be a functional equivalent Fresnel lens or holographic element.

The astigmatic nature of the lenticular projector system according to this invention may be overcome by adding a concave cylindrical lens 110, FIG. 11, which causes the image formed at screen 36c to appear to be farther away. By choosing the proper focal length, the image 36'c can be made to appear farther away at the distance of the object 40c and thereby eliminate the astigmatism. Alternatively, a convex cylindrical lens 112, FIG. 12, may be employed which will cause the image formed at the object 40d to appear closer. With the proper focal length the image of the object 40d can be made to appear at lenticular screen 38d and merge with the image 36d to eliminate the astigmatism. Lenses 110 and 112 can be combined to correct the astigmatism and in their singular or combined form may be implemented with Fresnel lenses or holographic elements.

Figure 13:
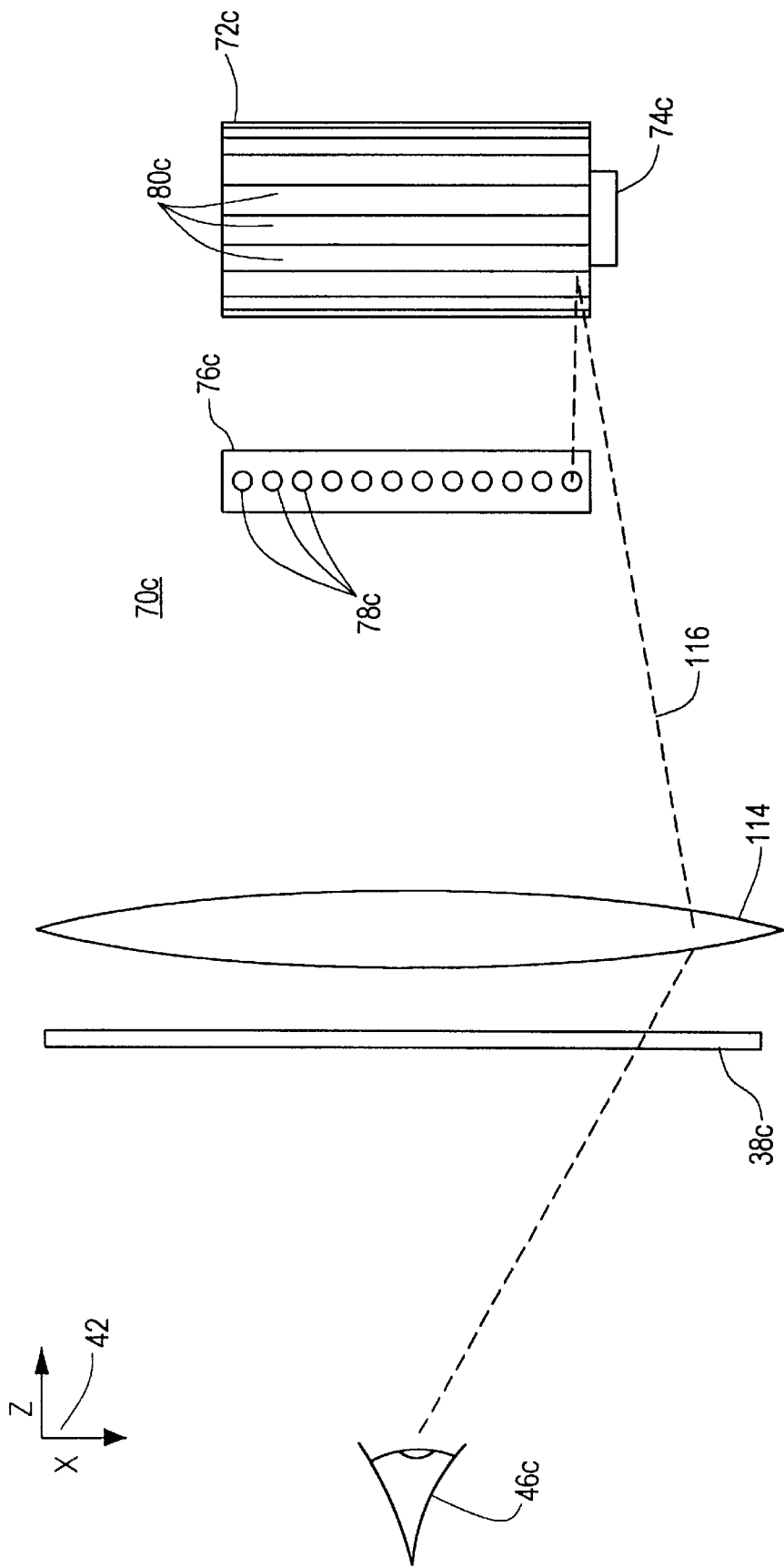
FIG. 13 is a view similar to FIG. 8 with a magnifying lens added to produce an enlarged image.

If it is desired to make the image larger in the X dimension, a cylindrical lens 114, FIG. 13, may be employed between light source 76c and lenticular screen 38c where the slit and mask once again have been omitted for clarity. There it can be seen that the light ray 116, for example, captured and refracted by lens 114, creates a much larger image viewable by observer 46c via lenticular screen 38c.

The invention includes a construction that allows doubling the number of scan lines on the screen 38 without increasing the number of light emitters 78, FIG. 14. The axis of the rotating mirror is indicated by 42, the drum is not shown for clarity. One of the facets of the drum is indicated by 43 and is set at an angle parallel to the axis of rotation 42. A different facet 44 of the drum is set at a slight angle to the axis of rotation 42. The light path of ray 48 that strikes facet 43 will be different than the light path 47 that strikes the angled facet 44. The viewer 46 will see this as separate scan lines. Thus a single light emitter 46 can generate two scan lines. Each of the two scan lines will be drawn in succession as each of the facets rotate past the light emitter. The angled facet may be made piecewise from angled segments 49, FIG. 14A, rather than a single planar surface.

The resultant display 38d is shown in FIG. 15. The entire display 38d is made of scan lines, some of which are indicated by 134. The entire image will be produced when two facets of the rotating have passed over the screen 38d. When the facet that is parallel to the axis produces the scan, the scan lines indicated by 130 might be produced. When the angled facet scans the display then the scan lines indicated by 132 might be produced. This construction is not limited to two different angles of mirrors on the rotating mirror drum. The facets can be set at many angles and the resultant image will be produced by many scan fields.

Figure 16:
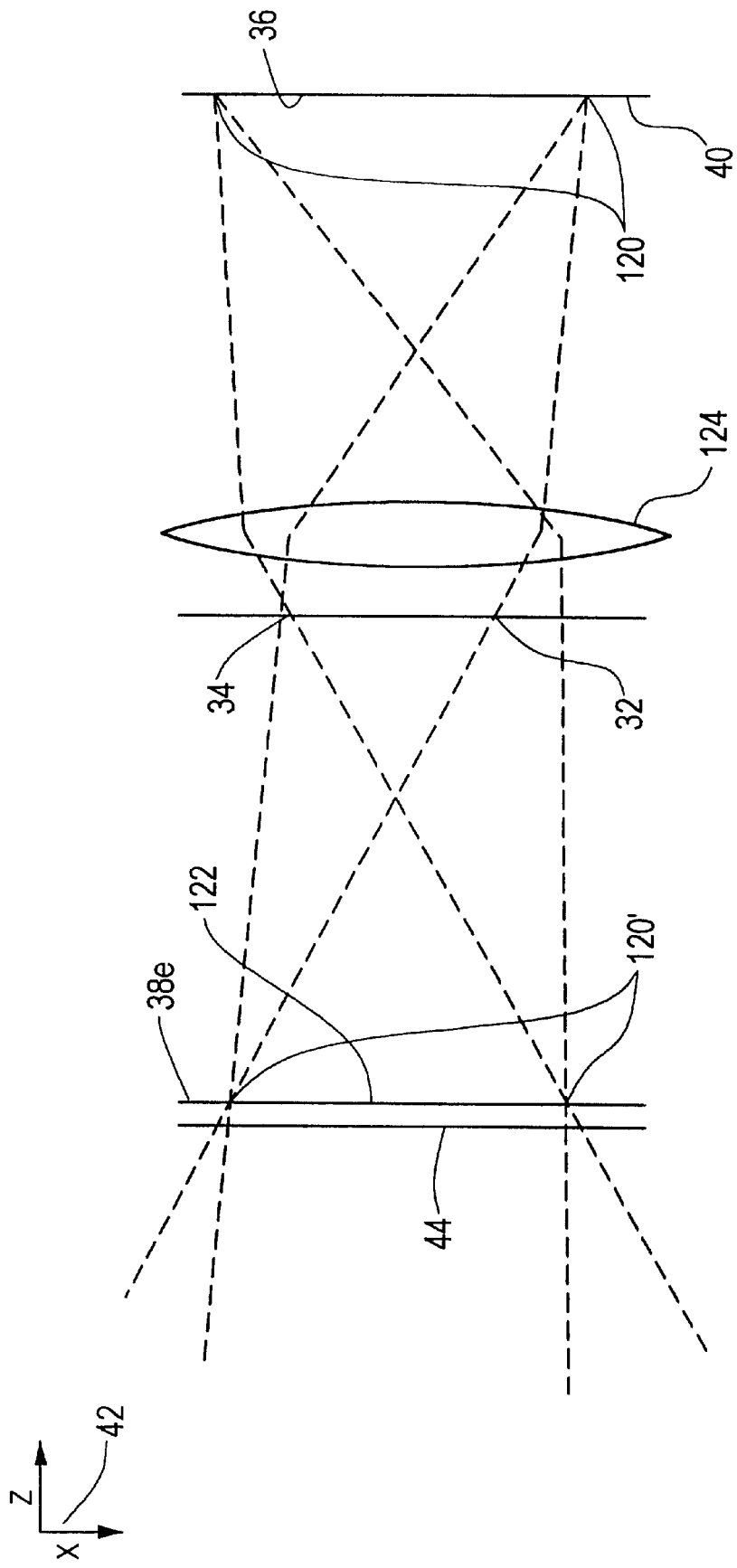
FIG. 16 is a view similar to FIGS. 11 and 12 showing a alternative technique for correcting astigmatism.

An alternate method of correcting the astigmatism of the display is accomplished by placing a cylindrical convex lens 124, FIG. 16, in the optical path between the object 40 and the screen 122. The focal length of the lens 124 and its position in the optical path should be such that a virtual focal plane 122 is created at the screen 38e. Thus a virtual image 122 in the X axis is produced in the same plane as the screen 38e and where the actual image is produced in the Y axis thereby eliminating the astigmatism. The light rays that create the virtual image 122 are shown as emanating from points 120. These rays ar focused at the virtual image 122 at points 120'. The rays continue through the screen 38e unaltered.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An astigmatic lenticular projector system comprising:
    beam forming means for generating a family of planar light beams representative of an object; and
    image forming means for diverging the light in each of said planar light beams transversely to the plane of said beams and not diverging said light along the plane of the beams for generating a viewable astigmatic image irrespective of the distances between said image forming means, said beam forming means, and said object.

2. The astigmatic lenticular projector system of claim 1 in which said beam forming means and said image forming means create a first focal length for the astigmatic image along the plane of said planar light beams and a second focal length for the astigmatic image transverse to the plane of said planar light beams.

3. The astigmatic lenticular projector system of claim 1 in which said beam forming means includes a mask with an elongate slit.

4. The astigmatic lenticular projector system of claim 1 in which said image forming means includes a parallel array of astigmatic lenses.

5. The astigmatic lenticular projector system of claim 4 in which said parallel array of astigmatic lenses includes cylindrical lenses.

6. The astigmatic lenticular projector system of claim 1 in which said image forming means includes a lenticular array of lenticules.

7. The astigmatic lenticular projector system of claim 1 in which said image forming means includes a holographic element.

8. The astigmatic lenticular projector system of claim 5 in which said cylindrical lenses are concave.

9. The astigmatic lenticular projector system of claim 5 in which said cylindrical lenses are convex.

10. The astigmatic lenticular projector system of claim 1 in which said beam forming means includes a light source for creating a planar primary light beam and scanner means for sweeping said primary light beam across said image forming means to create said family of planar light beams.

11. The astigmatic lenticular projector system of claim 10 in which said light source includes a source of illumination and a mask with an elongate slit.

12. The astigmatic lenticular projector system of claim 10 in which said scanner means includes a rotatable multifaceted mirror wheel and means for rotating said mirror wheel.

13. The astigmatic lenticular projector system of claim 1 in which said light source includes a set of discrete illuminator elements for creating a set of scan lines in the astigmatic image.

14. The astigmatic lenticular projector system of claim 10 in which said light source includes a number of sets of discrete illumination elements each set having a different color.

15. The astigmatic lenticular projector system of claim 1 wherein said imaging means has a plurality of viewing angles in which said image forming means includes a cylindrical aligning lens with its axis parallel to the axis of the form of planar light beams for aligning said plurality of viewing angles across the image forming means.

16. The astigmatic lenticular projector system of claim 2 in which said image forming means include astigmatic correction lens means for relatively adjusting said focal lengths towards each other.

17. The astigmatic lenticular projector system of claim 16 in which said astigmatic correction lens means equalizes said focal lengths.

18. The astigmatic lenticular projector system of claim 16 in which said astigmatic correction lens means includes a convex cylindrical lens.

19. The astigmatic lenticular projector system of claim 16 in which said astigmatic correction lens means includes a concave cylindrical lens.

20. The astigmatic lenticular projector system of claim 1 in which said image forming means includes a magnifying lens for enlarging the image in the direction parallel to the family of planar beams.

21. The astigmatic lenticular projector system of claim 20 in which said magnifying lens is a cylindrical lens with its axis transverse to the family of planar beams.

22. The astigmatic lenticular projector system of claim 1 in which said light is visible light.

23. The astigmatic lenticular projector system of claim 1 in which said beam forming means includes polarizing means for generating dual images of opposite polarization for creating three dimensional images.

24. The astigmatic lenticular projector system of claim 12 in which said facets are tilted relative to one another to increase the number of scan lines.

25. The astigmatic lenticular projector system of claim 12 in which each facet includes a number of inclined sections to increase the number of scan lines.

26. The astigmatic lenticular projector system of claim 16 in which said astigmatic corrective lens creates a virtual image of one of said images at the focal plane of the other.

27. An astigmatic lenticular projector system comprising:
    beam forming means for generating a family of planar light beams representative of an object, where said beam forming means includes a light source, having a source of illumination and a mask with an elongate slit, for creating a planar primary light beam and a scanner means for sweeping said primary light beam across said image forming means to create said family of planar light beams; and
    image forming means for diverging the light in each of said planar light beams transversely to the plane of said beams and not diverging said light along the plane of the beams for generating a viewable astigmatic image.

28. An astigmatic lenticular projector system comprising:
    beam forming means for generating a family of planar light beams representative of an object, where said beam forming means includes a light source, having a number of sets of discrete illumination elements each set having a different color, for creating a planar primary light beam and a scanner means for sweeping said primary light beam across said image forming means to create said family of planar light beams; and
    image forming means for diverging the light in each of said planar light beams transversely to the plane of said beams and not diverging said light along the plane of the beams for generating a viewable astigmatic image.

29. An astigmatic lenticular projector system comprising:
    beam forming means for generating a family of planar light beams representative of an object, where said beam forming means and said image forming means create a first focal length for the astigmatic image along the plane of said planar light beams and a second focal length for the astigmatic image transverse to the plane of said planar light beams; and
    image forming means, including astigmatic correction lens means for relatively adjusting said focal lengths towards each other, for diverging the light in each of said planar light beams transversely to the plane of said beams and not diverging said light along the plane of the beams for generating a viewable astigmatic image.

30. The astigmatic lenticular projector system of claim 29 in which said astigmatic correction lens means equalizes said focal lengths.

31. The astigmatic lenticular projector system of claim 29 in which said astigmatic correction lens includes a convex cylindrical lens.

32. The astigmatic lenticular projector system of claim 29 in which said astigmatic correction lens includes a concave cylindrical lens.

33. An astigmatic lenticular projector system comprising:

beam forming means for generating a family of planar light beams representative of an object, where said beam forming means includes a light source, having a source of illumination and a mask with an elongate slit, for creating a planar primary light beam and a scanner means for sweeping said primary light beam across said image forming means to create said family of planar light beams; and image forming means for diverging the light in each of said planar light beams transversely to the plane of said beams and not diverging said light along the plane of the beams for generating a viewable astigmatic image;

where said scanner means includes a rotatable multifaceted mirror wheel and means for rotating said mirror wheel, where said facets are tilted relative to one another to increase the number of scan lines.

34. An astigmatic lenticular projector system comprising:

beam forming means for generating a family of planar light beams representative of an object, where said beam forming means includes a light source, having a source of illumination and a mask with an elongate slit, for creating a planar primary light beam and a scanner means for sweeping said primary light beam across said image forming means to create said family of planar light beams; and image forming means for diverging the light in each of said planar light beams transversely to the plane of said beams and not diverging said light along the plane of the beams for generating a viewable astigmatic image;

where said scanner means includes a rotatable multifaceted mirror wheel and means for rotating said mirror wheel, where each said facet includes a number of inclined sections to increase the number of scan lines.

35. An astigmatic lenticular projector system comprising:

beam forming means for generating a family of planar light beams representative of an object, where said beam forming means and said image forming means create a first focal length for the astigmatic image along the plane of said planar light beams and a second focal length for the astigmatic image transverse to the plane of said planar light beams; and image forming means, including astigmatic correction lens means which creates a virtual image of one of said images at the focal plane of the other for relatively adjusting said focal lengths towards each other, for diverging the light in each of said planar light beams transversely to the plane of said beams and not diverging said light along the plane of the beams for generating a viewable astigmatic image.

* * * * *